(12) United States Patent
Pehlke et al.

(10) Patent No.: US 10,256,851 B2
(45) Date of Patent: Apr. 9, 2019

(54) SYSTEMS AND METHODS RELATED TO TIME-DIVISION AND FREQUENCY-DIVISION DUPLEX PROTOCOLS FOR WIRELESS APPLICATIONS

(71) Applicant: SKYWORKS SOLUTIONS, INC., Woburn, MA (US)

(72) Inventors: David Richard Pehlke, Westlake Village, CA (US); Joel Richard King, Newbury Park, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/737,141

(22) Filed: Jun. 11, 2015

(65) Prior Publication Data

US 2016/0006556 A1   Jan. 7, 2016

Related U.S. Application Data

(60) Provisional application No. 62/010,770, filed on Jun. 11, 2014.

(51) Int. Cl.
| | | |
|---|---|---|
| *H04B 1/00* | (2006.01) | |
| *H04L 5/14* | (2006.01) | |
| *H04W 72/00* | (2009.01) | |

(52) U.S. Cl.
CPC .......... *H04B 1/0057* (2013.01); *H04L 5/1469* (2013.01); *H04W 72/00* (2013.01)

(58) Field of Classification Search
CPC .......... H04B 1/006; H04B 1/40; H04L 5/1461
See application file for complete search history.

(56) References Cited

U.S. PATENT DOCUMENTS

| | | | |
|---|---|---|---|
| 2002/0090974 A1* | 7/2002 | Hagn | H04B 1/005 |
| | | | 455/552.1 |
| 2007/0081489 A1 | 4/2007 | Anderson et al. | |
| 2008/0144612 A1 | 6/2008 | Honkasalo et al. | |
| 2013/0121189 A1 | 5/2013 | Bhattad et al. | |
| 2014/0024329 A1* | 1/2014 | Khlat | H04B 1/0057 |
| | | | 455/307 |
| 2014/0086112 A1 | 3/2014 | Stern-Berkowitz et al. | |
| 2014/0092794 A1 | 4/2014 | Yang et al. | |
| 2014/0295775 A1* | 10/2014 | Rousu | H04B 1/006 |
| | | | 455/73 |
| 2014/0307836 A1* | 10/2014 | Khlat | H04L 5/1461 |
| | | | 375/343 |
| 2015/0289215 A1* | 10/2015 | Kaukovuori | H04W 52/146 |
| | | | 370/329 |

OTHER PUBLICATIONS

International Search Report and Written Opinion for PCT/US2015/035369 dated Oct. 13, 2015.

* cited by examiner

*Primary Examiner* — Melanie Jagannathan
(74) *Attorney, Agent, or Firm* — Chang & Hale LLP

(57) ABSTRACT

Systems and methods related to time-division and frequency-division duplex protocols for wireless applications. In some embodiments, a wireless architecture can include a radio-frequency (RF) path configured to support a first modified time-division duplex (TDD) band operation and a second modified TDD band operation. Such a wireless architecture can allow consolidation of signal paths and/or re-use of components such as filters and duplexers, to advantageously reduce or eliminate some paths and/or components.

14 Claims, 10 Drawing Sheets

SYSTEMS AND METHODS RELATED TO TIME-DIVISION AND FREQUENCY-DIVISION DUPLEX PROTOCOLS FOR WIRELESS APPLICATIONS

CROSS-REFERENCE TO RELATED APPLICATION(S)

This application claims priority to U.S. Provisional Application No. 62/010,770 filed Jun. 11, 2014, entitled SYSTEMS AND METHODS RELATED TO TIME-DIVISION AND TIME-DIVISION/FREQUENCY-DIVISION DUPLEX WIRELESS PROTOCOLS, the disclosure of which is hereby expressly incorporated by reference herein in its entirety.

BACKGROUND

Field

The present disclosure relates to time-division duplexing (TDD) and frequency-division duplexing (FDD) for wireless applications.

Description of the Related Art

In wireless applications, duplexing functionality (e.g., among transmit (Tx) and receive (Rx) operations) can be implemented as time-division duplexing (TDD) or frequency-division duplexing (FDD). In a typical TDD system, a single frequency can be utilized to provide support both Tx and Rx operations by switching between Tx and Rx modes rapidly so as to be imperceptible to a user. In a typical FDD system, a first frequency can be utilized for a Tx operation, and a second frequency can be utilized for an Rx operation.

SUMMARY

In accordance with some implementations, the present disclosure relates to a wireless architecture having a radio-frequency (RF) path configured to support a first modified time-division duplex (TDD) band operation and a second modified TDD band operation.

In some embodiments, each of the first and second modified TDD bands can be based on a band defined by E-UTRA Operating Bands. The first and second modified TDD bands can overlap in frequency by an amount that is less than or equal to a lesser of bandwidths of the first and second modified TDD bands. Each of the first and second modified TDD bands can be configured to support either or both of a transmit (Tx) operation and a receive (Rx) operation.

In some embodiments, each of the first and second modified TDD bands can be configured to support a Tx operation. The RF path can include a Tx filter configured to support the Tx operations with the first and second modified TDD bands. The first modified TDD band can include, for example, a B38* Tx band having a frequency range of 2550 MHz-2690 MHz based on an E-UTRA band B38, and the second modified TDD band can include, for example, a B41* Tx band having a frequency range of 2550 MHz-2690 MHz based on an E-UTRA band B41.

In some embodiments, each of the first and second modified TDD bands can be configured to support an Rx operation. The RF path can include an Rx filter configured to support the Rx operations with the first and second modified TDD bands. The first modified TDD band can include, for example, a B38* Rx band having a frequency range of 2496 MHz-2640 MHz based on an E-UTRA band B38, and the second modified TDD band can include, for example, a B41* Rx band having a frequency range of 2496 MHz-2640 MHz based on an E-UTRA band B41.

In some embodiments, each of the first and second modified TDD bands can be configured to support both Tx and Rx operations. The RF path can include a TDD filter configured to support both of the Tx and Rx operations. Each of the first and second modified TDD bands can include, for example, a B41* TDD-A band having a frequency range of 2496 MHz-2605 MHz based on an E-UTRA band B41. Each of the first and second modified TDD bands can include, for example, a B41* TDD-B band having a frequency range of 2585 MHz-2690 MHz based on an E-UTRA band B41.

In some embodiments, at least one of the first and second modified TDD bands can include a frequency range associated with an FDD band. The first modified TDD band can be based on an E-UTRA TDD band, and the second modified TDD band can be based on an E-UTRA FDD band. The RF path can include a portion of a duplexer (DPX) configured to support the second modified TDD band.

In some embodiments, the portion of the duplexer can include a Tx side of the duplexer. The first modified TDD band can include, for example, a B38*/B41* Rx band having a frequency range of 2496 MHz-2640 MHz based on E-UTRA bands B38 and B41, and the second modified TDD band can include, for example, a B7* Tx band having a frequency range of 2496 MHz-2570 MHz based on an E-UTRA band B7 Tx. The wireless architecture can be substantially free of one or more Rx filters for the B38*/B41* Rx band.

In some embodiments, the portion of the duplexer can include an Rx side of the duplexer. The first modified TDD band can include, for example, a B38*/B41* Tx band having a frequency range of 2550 MHz-2690 MHz based on E-UTRA bands B38 and B41, and the second modified TDD band can include, for example, a B7* Rx band having a frequency range of 2620 MHz-2690 MHz based on an E-UTRA band B7 Rx. The wireless architecture can be substantially free of one or more Tx filters for the B38*/B41* Tx band.

In some embodiments, the B38*/B41* Tx band can include a plurality of band segments such that the first modified TDD band includes one or more of the band segments. The first modified TDD band can include, for example, a B41C band segment having a frequency range of 2620 MHz-2690 MHz based on an E-UTRA band B41. The wireless architecture can be substantially free of one or more filters associated with the B41C band segment.

In some embodiments, the portion of the duplexer can include a Tx side of the duplexer or an Rx side of the duplexer. The wireless architecture can be substantially free of one or more filters associated with the second modified TDD band.

In some embodiments, each of the first and second modified TDD bands can be configured to yield a reduced relative percentage bandwidth. In some embodiments, the first and second modified TDD bands can partially overlap in frequency such that the amount of overlap is less than the lesser of bandwidths of the first and second modified TDD bands. The amount of overlap can be selected based at least in part on roll-off characteristics associated with either or both of the first modified TDD bands.

In some teachings, the present disclosure relates to a method for operating a wireless device. The method includes providing a radio-frequency (RF) path, and performing a first modified time-division duplex (TDD) band operation with at least a portion of the RF path. The method further includes performing a second modified TDD band operation with at least a portion of the RF path.

In a number of implementations, the present disclosure relates to a radio-frequency (RF) front-end module that includes a packaging substrate configured to receive a plurality of components, and a radio-frequency (RF) circuit implemented on the packaging substrate. The RF circuit includes a path configured to provide support for a first modified time-division duplex (TDD) band operation and a second modified TDD band operation.

In some implementations, the present disclosure relates to a wireless device that includes a transceiver configured to process radio-frequency (RF) signals, and an antenna in communication with the transceiver configured to facilitate transmission of an amplified RF signal. The wireless device further includes a front-end module connected to the transceiver and the antenna. The front-end module includes an RF circuit having a path configured to provide support for a first modified time-division duplex (TDD) band operation and a second modified TDD band operation. In some embodiments, the front-end module can be configured to operate in a 3GPP mode.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Disclosed herein are non-limiting examples of systems, methods and circuits related to radio communication links, such as those that include Time Division Duplex (TDD) protocols, as well as those that include a combination of both TDD and Frequency Division Duplex (FDD) protocols. In a typical FDD system, a first frequency is utilized for transmitted (Tx) signals, and a second frequency is utilized for received (Rx) signals. Because of such pairing of frequencies, simultaneous operation of Tx and Rx features is possible. In a typical TDD system, a single frequency can be utilized to provide both Tx and Rx functionalities by switching between Tx and Rx operations rapidly so as to be imperceptible to a user.

In some communication systems, spectral allocations defined by standards bodies dictate the bands that may be used for FDD and/or TDD, and often there are band definitions which provide for overlap of part or entire portions of one band with another. When multi-band communication devices are designed to support combinations of these bands, such devices can be configured to, for example, consolidate paths, eliminate filters, and/or significantly improve cost and/or insertion loss performance of the front-end.

When the bands under consideration are TDD, such devices can be further configured to provide consolidation amongst TDD paths, as well as consolidations among one or more combinations of FDD and TDD paths since the TDD transmit (Tx) and receive (Rx) functions are not active simultaneously.

Although various examples of consolidating embodiments are described herein in contexts of specific example frequency bands defined by the 3GPP standards body, it will be understood that one or more features of the present disclosure can also be applied to other frequency bands associated with the 3GPP standard and/or other wireless communication standards.

Figure 1:
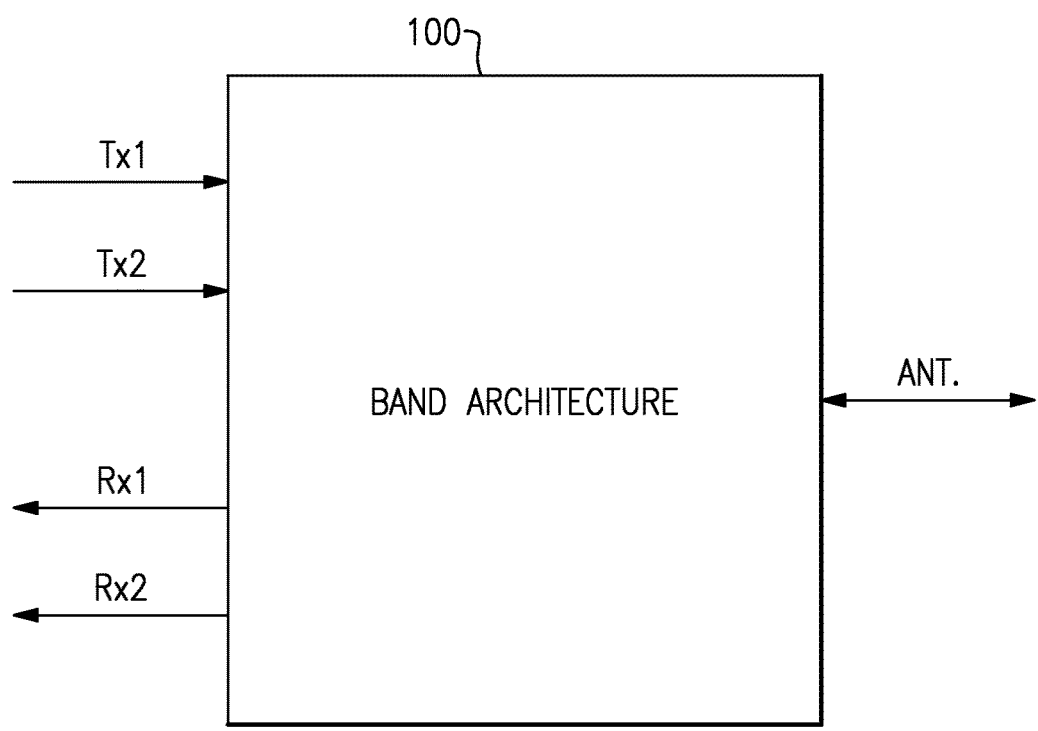
FIG. 1 depicts a band architecture that can be configured to provide pathways for different bands associated with wireless operations.

FIG. 1 depicts a band architecture 100 that can be configured to provide pathways for different bands associated with wireless operations. In some implementations, such pathways can be configured to provide consolidation among TDD paths, and/or consolidations among one or more combinations of FDD and TDD paths. Various examples of such path-consolidations are described herein in greater detail.

In the example shown in FIG. 1, the band architecture 100 can be configured to provide one or more paths for a plurality of transmit channels (indicated as Tx1 and Tx2) to an antenna. The band architecture 100 can also be configured to provide one or more paths for a plurality of receive channels (indicated as Rx1 and Rx2) for signals received by the antenna. Although described in the context of an antenna that provides both Tx and Rx functionalities, it will be understood that one or more features of the present disclosure can also be implemented in systems having more than one antenna.

Figure 2:
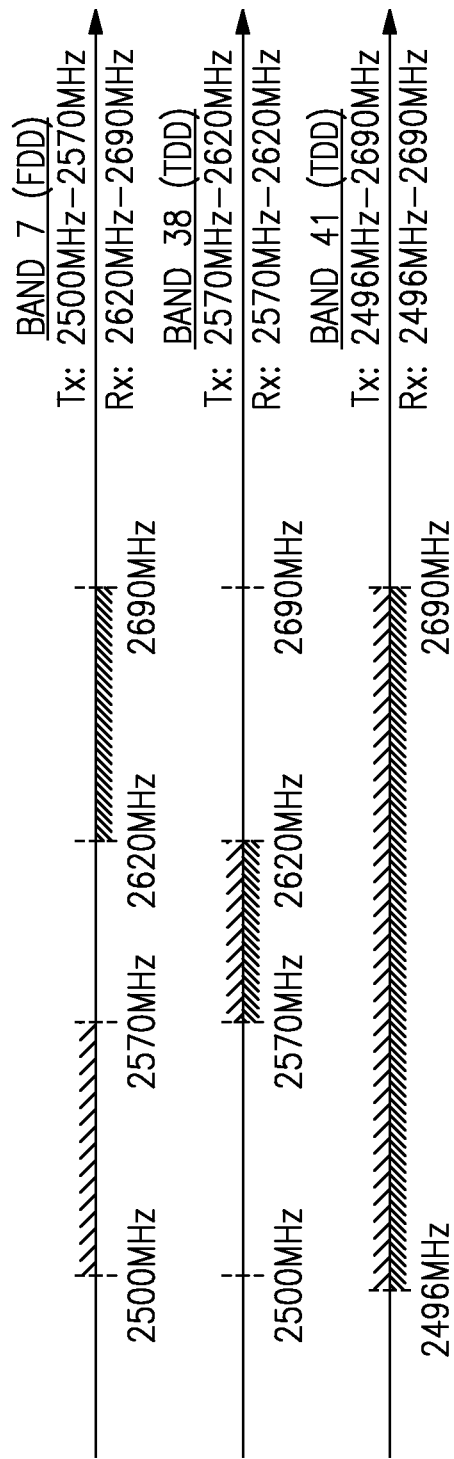
FIG. 2 shows specific examples of frequency bands that can be utilized in 3GPP wireless devices.

FIG. 2 shows specific examples of frequency bands that can be utilized in 3GPP (3rd Generation Partnership Project) wireless devices. For example, Band 7 (B7) is defined to operate in FDD, and thus will have simultaneous Tx and Rx operations via Tx (2500 MHz-2570 MHz) and Rx (2620 MHz-2690 MHz) paths. This is typically accomplished through the use of a duplexer, which serves the purpose of both combining the Tx and Rx paths into a common terminal, and providing significant isolation between the Tx and Rx paths (e.g., to avoid interference of the Rx by the much higher power and noise level of the Tx path).

To provide such significant isolation, the two relative pass bands of the two sides of the duplexer are typically separated by a guard band. It is also desirable to provide high attenuation outside each passband, especially within the passband of its partnered band. Such a configuration typically results in frequency roll-off at the edges of the passband nearest the partner band, and significant additional insertion loss in the passband as a result of the isolation requirement.

In addition to higher insertion loss typically imposed for relatively small frequency gaps between the two partner bands, there can be a penalty in insertion loss also imposed by the bandwidth of the passband as a percentage of the band's center frequency. Typically, the larger this ratio of the passband bandwidth to center frequency becomes (termed the percentage relative bandwidth), the larger the passband insertion loss of the filter will be. For example, Band 7 has a relative percentage bandwidth of 70 MHz/2535 MHz=2.8% relative bandwidth for its transmit portion, but with a guard band of only 50 MHz/2595 MHz=1.9% relative duplex gap bandwidth.

Band 38 (B38) is also shown in FIG. 2, and is an example of a TDD band allocation. Accordingly, the Tx and Rx paths are not on at the same time. The Tx and Rx are both defined to cover the same frequency span, as they are active at different times and can efficiently use that same spectrum while the other path is idle. The Tx and Rx spectral spans are both defined to be in the guardband of Band 7, and typically do not have a coexistence issue because Band 38 and Band 7 are typically defined for entirely different geographical regions and therefore do not interact.

The percentage relative bandwidth of Band 38 is 1.9% and does not have strong out-of-band attenuation requirements near its band edges. Both these factors help to reduce the insertion loss of Band 38 filters.

In another example, Band 41 (B41) is also a TDD band, but can pose a significant challenge as can be seen in FIG. 2 due to its large passband and percentage relative bandwidth=194 MHz/2593 MHz=7.5%.

All of the foregoing example bands (B7, B38, B41) can pose significant challenges because losses generally increase with frequency. Accordingly, the example 2.5 GHz operation generally yields higher losses than, for example an 800 MHz operation of lower cellular bands.

Figure 3A:
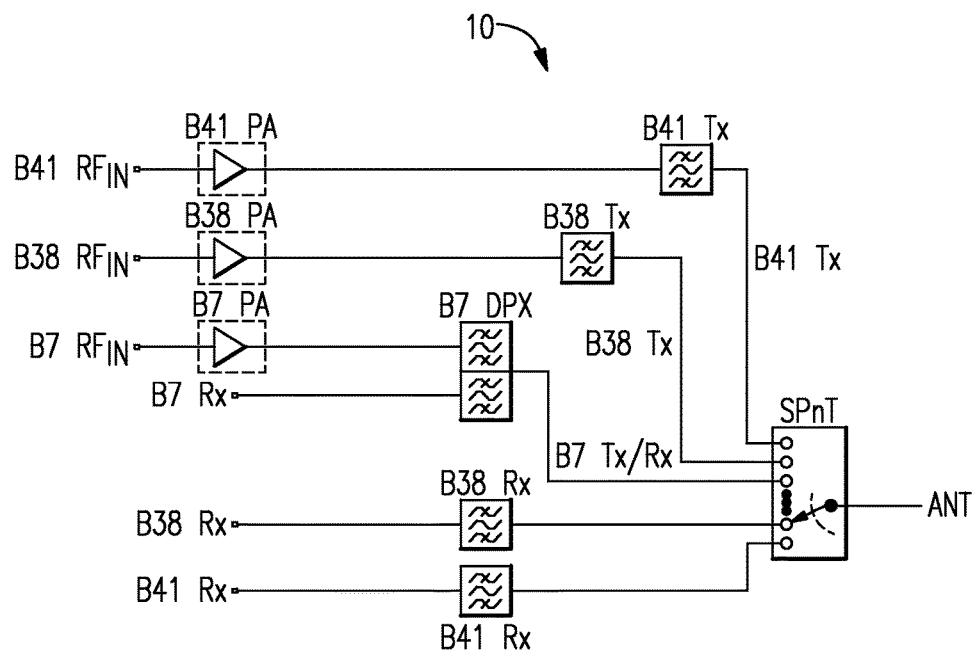
FIGS. 3A and 3B show examples of architectures that can be implemented for the 3GPP frequency bands of FIG. 2.
Figure 3B:
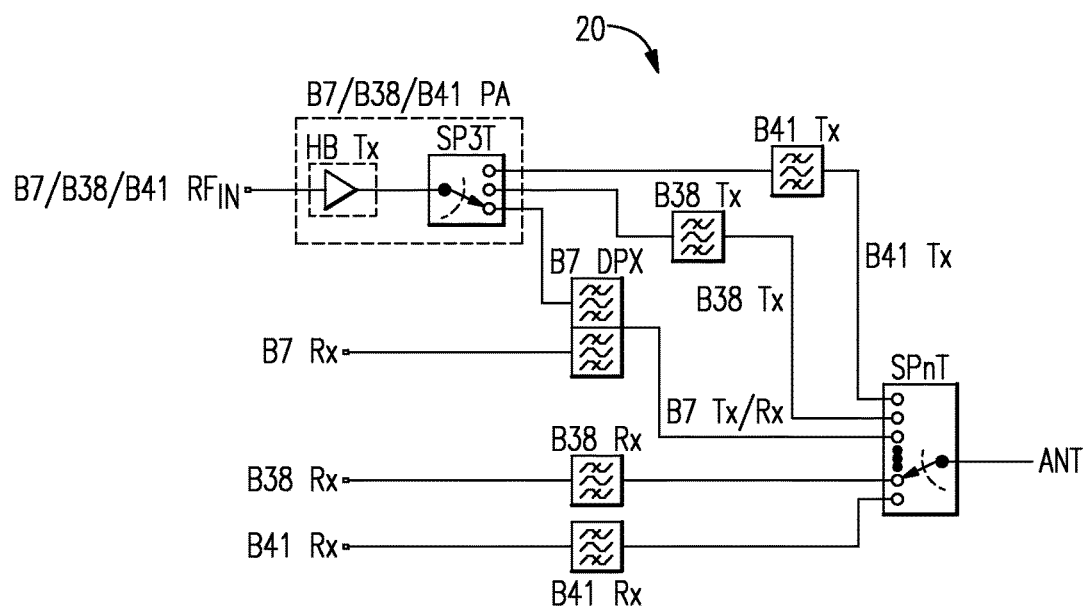

FIGS. 3A and 3B show examples of architectures that can be implemented for the 3GPP frequency bands of FIG. 2. In an example configuration 10 of FIG. 3A, a dedicated power amplifier (PA) ("B41 PA," "B38 PA," or "B7 PA") can be implemented to amplify the Tx signal of each dedicated band ("B41 RFin," "B38 RFin," or "B7 RFin").

Band 7 is shown to utilize a post-PA duplexer ("B7 DPX") for FDD-based simultaneous operation of the B7 RFin path and "B7 Rx" path to and from an antenna ("ANT") through a common path "B7 Tx/Rx" and a switch "SPnT."

Band 38 is shown to utilize a post-PA Tx filter ("B38 Tx") for transmission through a path "B38 Tx," the switch SPnT and the antenna. For TDD operation, a dedicated Rx path from the antenna, through the SPnT switch and an Rx filter ("B38 Rx"), is shown to be provided to an Rx output "B38 Rx." The SPnT switch can be configured to provide some or all of the TDD functionality.

Similarly, Band 41 is shown to utilize a post-PA Tx filter ("B41 Tx") for transmission through a path "B41 Tx," the switch SPnT and the antenna. For TDD operation, a dedicated Rx path from the antenna, through the SPnT switch and an Rx filter ("B41 Rx"), is shown to be provided to an Rx output "B41 Rx." The SPnT switch can be configured to provide some or all of the TDD functionality.

In an example configuration 20 of FIG. 3B, a common broadband PA ("B7/B38/B41 PA") is shown to amplify signals from a common input ("B7/B38/B41 RFin"). A selected path among B7, B38, and B41 can be switched by, for example, an SP3T switch of the common broadband PA. The FDD-based simultaneous operation of the B7 Tx and Tx, and TDD-based operations of the B38 and B41 bands can be performed similarly to those described in reference to FIG. 3A.

In both FIGS. 3A and 3B, one can note that the TDD filters for Tx and Rx can cover the same frequency range, but may be designed somewhat differently for power handling and intermodulation performance.

Figure 4:
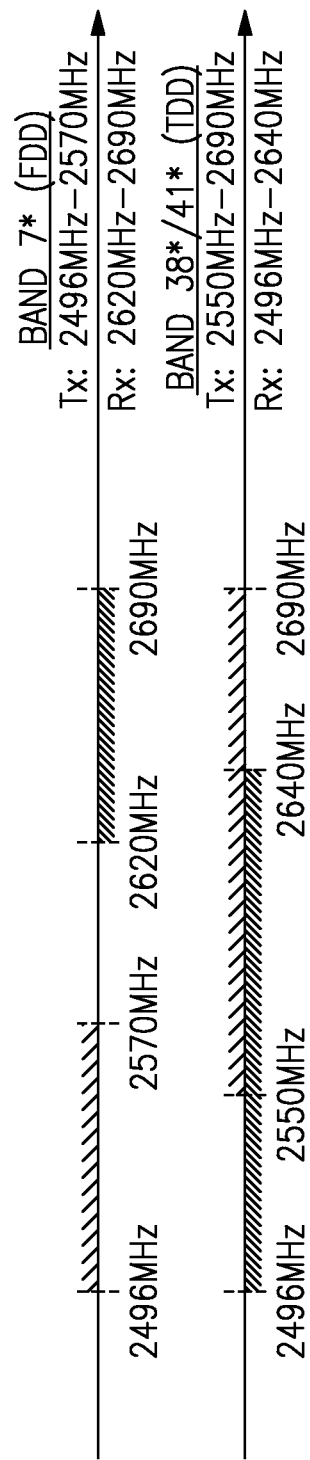
FIG. 4 shows an example of a frequency partitioning configuration that can be implemented to provide similar coverage for the example of FIG. 2.

In some embodiments, one or more path consolidations can be implemented when frequency bands overlap for TDD operations. FIG. 4 shows an example of a frequency partitioning configuration that can be implemented to provide substantially the same coverage for the example 3GPP bands B7 (FDD), B38 (TDD), and B41 (TDD) bands. For the purpose of description, the corresponding bands in FIG. 4 are indicated as Band 7* (B7*), Band 38* (B38*), and Band 41* (B41*).

In some embodiments, such path consolidation can be implemented to provide coverage for desired bands with fewer filters, RF paths, and/or less insertion loss than the corresponding configurations without path consolidation. For example, in FIG. 4, B7*, B38*, and B41* frequency bands can be re-arranged into two sets of Tx/Rx filter spans.

The Tx band of B7* can be extended to cover down to 2496 MHz (from a standard definition of 2500 MHz) in order to cover the lowest frequencies of B41*. The receive side of the B7* duplexer can remain unchanged and the small incremental increase to the Tx bandwidth can increase the relative percentage bandwidth of the duplexer Tx passband from 2.8% to only 2.92%; and therefore does not incur material degradation in the B7* insertion loss.

The lower Tx frequency of B7* can, however, come closer to a restricted region of spectrum from 2400 MHz to 2485 MHz that is typically assigned to a lowband wireless LAN (WiFi) communication protocol. Thus, an attenuation can be provided to prevent or reduce coexistence issues between Tx and Rx of this extended B7*/B41* region, respectively, from the WiFi operation that may also be present inside the same handset. Without such an attenuation, a cellular transmission at the lower frequencies can leak power into the WiFi antenna of that same handset and de-sense its receiver if the transmission noise and spurious effects (e.g., spurious tones) are too high. Likewise, the WiFi transmission may leak spurious and/or noise into the cellular antenna associated with these extended B7* and B41* paths to de-sense the cellular link. In some operating situations, the additional 4 MHz (resulting from extending the lower B7 Tx frequency from 2500 MHz to 2496 MHz) is not considered significant here, but careful design considerations such as for foregoing examples can be implemented to avoid or reduce performance degradation.

FIG. 4 further shows that consolidation among B38 and B41 (of FIG. 2) can be implemented by utilizing the Tx and Rx paths of the extended Band 7 (B7*) to help in reducing the required bandwidth coverage of the remaining portions to completely cover Bands 38 and 41. By allocating, for example, at least 20 MHz overlap of the Tx (2550 MHz-2690 MHz) with the B7* Tx, the combination of the two paths can carry the maximum 20 MHz channel bandwidth defined in 3GPP LTE standard by using one or the other of the defined Tx paths. Similarly the Rx path can have the same 20 MHz overlap, and can be implemented, for example, from 2496 MHz to 2640 MHz. Both the Tx and Rx percentage relative bandwidths for Band 41 have been reduced from 194 MHz/2593 MHz=7.5% to 140 MHz/2568 MHz=5.5% and can therefore significantly improve insertion loss of the filter.

An advanced feature of the 3GPP standard (e.g., 3GPP specification 36.101 3rd Generation Partnership Project; Technical Specification Group Radio Access Network; Evolved Universal Terrestrial Radio Access (E-UTRA); User Equipment (UE) radio transmission and reception—3GPP TS 36.101 V10.5.0 (2011-12) section 5.6 (Release 10)) describes intra-band contiguously aggregated component carriers to extend the bandwidth of signals by linking adjacent channels together in active operation, thus creating effective channels that are much larger than 20 MHz. In order to address these use case scenarios, the overlap of the foregoing example bands can be selected based on factors such as coverage of the worst case of expected effective channel bandwidth, decrease in performance benefits that can occur with increase in the overlap, and spectral availability.

Figure 5A:
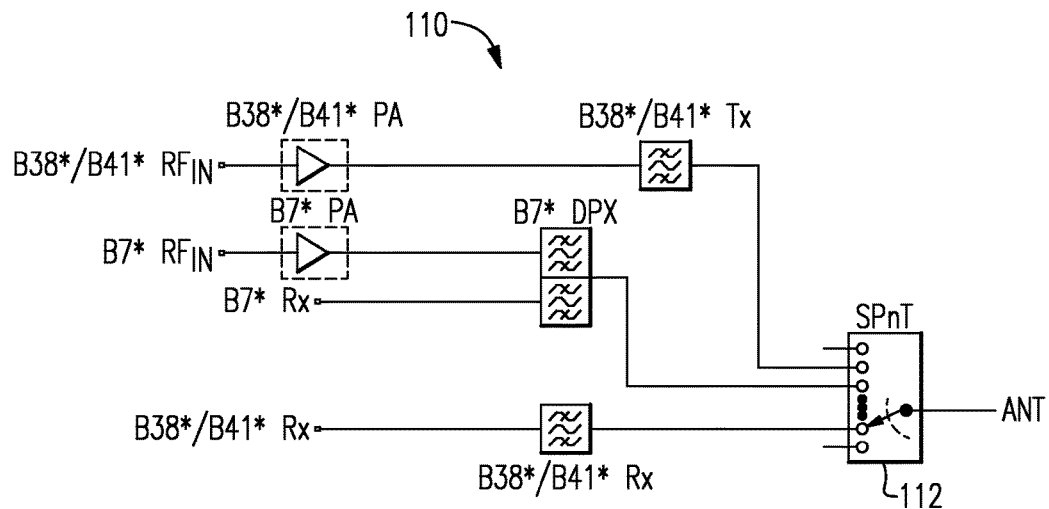
FIGS. 5A and 5B show examples of consolidated configurations that can be implemented utilizing the example band configuration of FIG. 4.
Figure 5B:
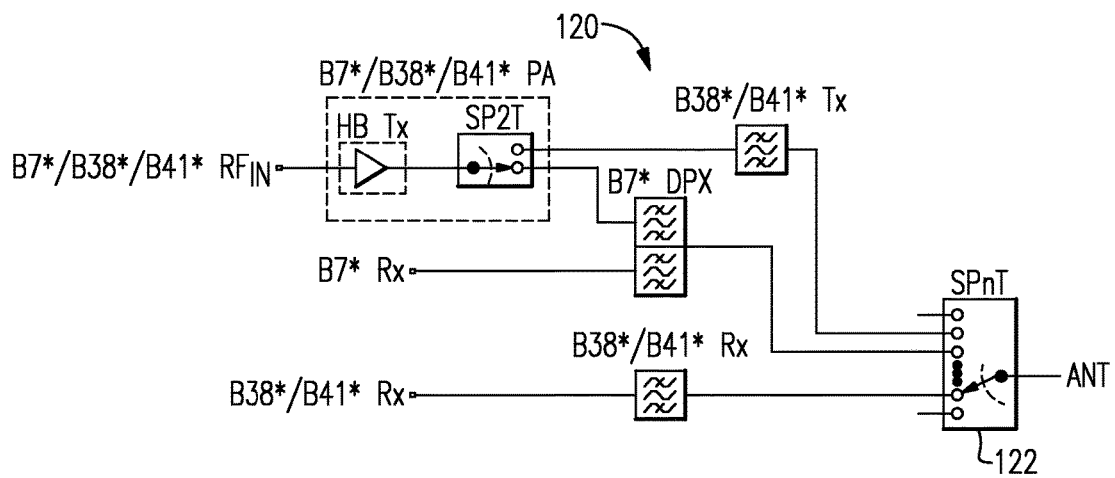

FIGS. 5A and 5B show examples of consolidated configurations that can be implemented to effectuate the example band configuration described in reference to FIG. 4. FIG. 5A shows an example configuration 110 that can include consolidation of some paths of the example 3GPP system of FIG. 3A. FIG. 5B shows an example configuration 120 that can include consolidation of some paths of the example 3GPP system of FIG. 3B.

In FIG. 5A, the example configuration 110 can include a dedicated PA (B38*/B41* PA, B7* PA) for each of the two defined Tx regions (B38*/B41* RFin, B7* RFin). As with the example configuration 10 of FIG. 3A, the Tx and Rx functionalities of the FDD band B7* can be facilitated by a duplexer "B7* DPX." One Rx filter ("B38*/B41* Rx") can be provided to cover the corresponding two regions defined for the Rx paths for the TDD bands B38* and B41* (e.g., 2496 MHz to 2640 MHz in the example of FIG. 4).

In FIG. 5B, the example configuration 120 can be similar to the example of FIG. 5A, but with the two dedicated PAs (B38*/B41* PA, B7* PA) replaced with a single PA ("B7*/B38*/B41* PA") that includes a "HB Tx" amplifier followed by, for example, a single-pole-two-throw (SP2T) switch. Duplexing of the B7* band's Tx and Rx, as well as the consolidated Rx filter ("B38*/B41* Rx") for the two Rx paths (for the TDD bands B38* and B41*) can be similar to those described in reference to FIG. 5A.

It is noted that in both these example implementations, a third Tx path, and some embodiments, the corresponding additional dedicated PA and Tx filter, can be eliminated. By consolidating down from 3 dedicated band paths to 2, one PA (in a Tx path) and 2 filters (one in a Tx path, and one in an Rx path) can be eliminated, and insertion loss can be improved with reduced bandwidth constraint for B41.

In some implementations, the present disclosure relates to a configuration where a given RF filter can be re-used for both Tx and Rx paths. Although described in the context of TDD operations, it will be understood that one or more features of such re-use can also be implemented in other modes of operation.

In some implementations, the consolidation of the TDD paths can involve a re-use of a single RF filter for both the Tx and the Rx paths. As described herein, the bandwidth of the Tx and Rx paths is typically the same for a standard TDD band, and a single filter can be used for both if an appropriate connectivity is provided.

Figure 6:
FIG. 6 shows an example TDD B41 configuration.
Figure 7:
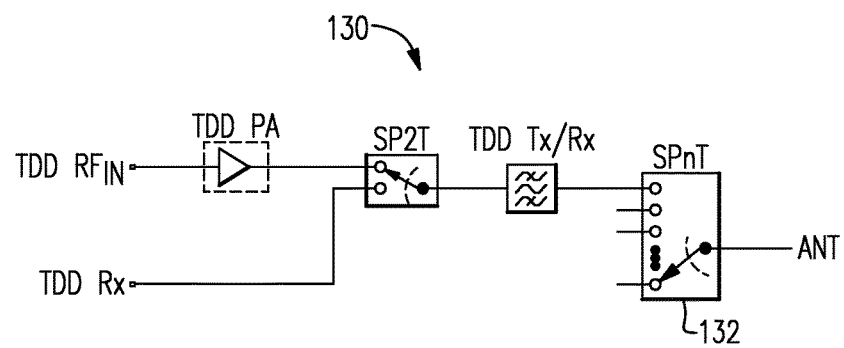
FIG. 7 shows an example of a TDD configuration implemented utilizing the TDD band of FIG. 6.

An example of such a configuration (130) is shown in FIG. 7, where a Tx/Rx switch (e.g., SP2T) can be inserted between a PA ("TDD PA") and a shared filter ("TDD Tx/Rx") in order to enable selection of either a Tx path ("TDD RFin" and "TDD PA") or an Rx path ("TDD Rx"). In some embodiments, such a configuration can be implemented in, for example, a TDD Band 41 configuration depicted in FIG. 6.

When the Tx path is enabled, the off isolation of the SP2T switch can be configured to handle the leakage of the PA's maximum output power onto the off Rx port. Typical isolation levels in some SP2T switches can provide, for example, about 30 dB attenuation (with only about 0.25 dB insertion loss of the enabled path), and such isolation levels can be sufficient to be able to maintain desirable Tx EVM (error vector magnitude) and linearity performance levels. As an example, many TDD systems typically use a similar switch/isolation connectivity for GSM operation without degradation in Tx performance. The much smaller and less expensive post-PA SP2T switch can offer some cost and area benefit over the additional Rx filter of standard implementations. In this way, some or all of a TDD band can be covered for both Rx and Tx with a single RF filter, with a small increment in insertion loss due to the SP2T switch (typically ≤0.25 dB). The simplification of an antenna switch 132 with fewer paths to support can offset some of such an addition in insertion loss at the SP2T switch (e.g., about 0.05 dB depending on switch technology and/or number of poles).

Figure 8:
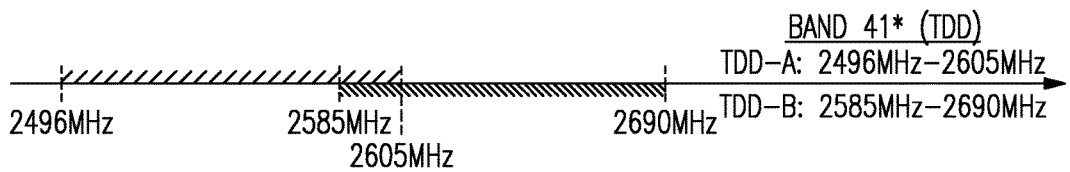
FIG. 8 shows an example of a modified TDD B41 band configuration B41*, where each of the Tx and Rx passband bandwidths is reduced from the example B41 configuration of FIG. 6.

FIG. 8 shows an example of a modified TDD B41 band configuration ("B41"), where each of the Tx and Rx passband bandwidths is reduced by almost a factor of 2 from the example B41 configuration of FIG. 6. In the example of FIG. 8, the B41* band is shown to include two partially-overlapping frequency segments, such that a first filter TDD-A corresponds to a frequency range of 2496 MHz-2605 MHz (bandwidth of 109 MHz which is 56% of the bandwidth of B41), and a second filter TDD-B corresponds to a frequency range of 2585 MHz-2690 MHz (bandwidth of 105 MHz which is 54% of the bandwidth of B41). As described in reference to FIG. 9, each of such frequency segments can be utilized as a TDD passband for both Tx and Rx operations. Accordingly, the first and second segmented Tx/Rx passbands can share a common overlap of, for example, a worst case maximum channel bandwidth of 20 MHz (between the upper limit 2605 MHz of the first segment and the lower limit 2585 MHz of the second segment) for an improvement in relative percentage bandwidth from 7.5% to 4.3%.

Figure 9:
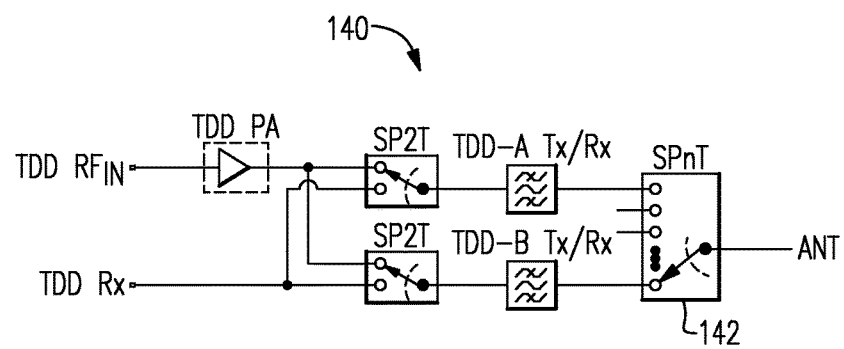
FIG. 9 shows an example configuration that can be implemented for TDD operation of the example B41* band structure of FIG. 8.

FIG. 9 shows an example configuration 140 that can be implemented for TDD operation of the example B41* band structure of FIG. 8. A combination of two Tx/Rx switches (e.g., SP2T switches) as shown can enable Tx and/or Rx to be connected through one or the other filter ("TDD-A Tx/Rx" or "TDD-B Tx/Rx"), enabling the use of two basic passbands for either Tx or Rx. Such Tx/Rx paths associated with the filters ("TDD-A Tx/Rx," "TDD-B Tx/Rx") are shown to be coupled to an antenna through an antenna switch 142. By sharing the Tx and Rx paths, this further consolidation can enable reduced filter bandwidths and/or provide relaxed requirements.

Referring to FIG. 9, an RF signal to be amplified and transmitted through an antenna (ANT) can be provided to a PA ("TDD PA") as TDD RFIN. Similarly, an RF signal received through the antenna and to be amplified (e.g., by an LNA (not shown)) can be output as TDD Rx. Each of such Tx (TDD RFIN) and Rx (TDD Rx) signals can be processed through either of the two example reduced-bandwidth filters indicated as TDD-A Tx/Rx and TDD-B Tx/Rx.

For example, if use of the TDD-A filter is desired for processing of both of the Tx and Rx signals, the antenna switch 142 can connect the antenna pole to the throw corresponding to the TDD-A Tx/Rx filter. In such a configuration of the antenna switch 142, the antenna pole can be disconnected from the throw corresponding to the TDD-B Tx/Rx filter. Accordingly, the TDD Rx output can be connected to the TDD-A Tx/Rx filter (and thereby to the antenna pole of the antenna switch 142) through the upper (as shown in FIG. 9) switch. Similarly, the TDD RFIN input can be connected to the TDD-A Tx/Rx filter (and thereby to the antenna pole of the antenna switch 142) through the same upper switch. Further, TDD operations can be achieved by switching operations of the upper SP2T switch.

Similarly, if use of the TDD-B filter is desired for processing of both of the Tx and Rx signals, the antenna switch 142 can connect the antenna pole to the throw corresponding to the TDD-B Tx/Rx filter. In such a configuration of the antenna switch 142, the antenna pole can be disconnected from the throw corresponding to the TDD-A Tx/Rx filter. Accordingly, the TDD Rx output can be connected to the TDD-B Tx/Rx filter (and thereby to the antenna pole of the antenna switch 142) through the lower (as shown in FIG. 9) switch. Similarly, the TDD RFIN input can be connected to the TDD-B Tx/Rx filter (and thereby to the antenna pole of the antenna switch 142) through the same lower switch. Further, TDD operations can be achieved by switching operations of the lower SP2T switch.

As frequency is increased in a channel within a given lower passband and rises to a maximum edge, frequency response of the corresponding filter will typically start to encounter amplitude roll-off and higher levels of insertion loss at the edge of the filter's passband. In the example of FIG. 8 as well as in other similar configurations, such a region overlaps the upper passband, whose insertion loss will not be limited by that same roll-off. Accordingly, the effects of filter roll-off and worst case insertion loss (especially over temperature as the filter skirts move up and down in frequency and typically limit the worst case performance of the filter overall) can be overcome. Further, at least in the area of the overlap, an individual filter roll-off characteristics can be further optimized or improved by selecting a lower insertion loss path.

Figure 10:
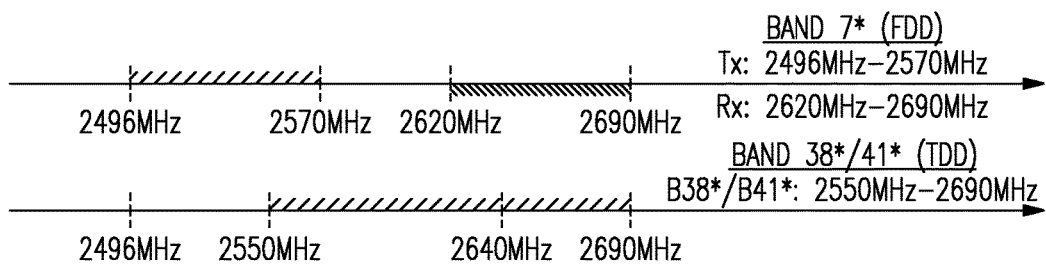
FIG. 10 shows an example band structure where an FDD B7* band has a Tx passband of 2496 MHz-2570 MHz and an Rx passband of 2620 MHz-2690 MHz, and where a consolidated TDD B38*/41* band has a Tx passband of 2550 MHz-2690 MHz.

In some embodiments, one or more features associated with a design approach of consolidating TDD bands and/or re-using filter(s) can similarly be implemented in more complex front-end architectures which include FDD paths as well. FIG. 10 shows an example band structure where an FDD B7* band has a Tx passband of 2496 MHz-2570 MHz and an Rx passband of 2620 MHz-2690 MHz. A consolidated TDD B38*/41* band is shown to have a Tx passband of 2550 MHz-2690 MHz. Similar to the example of FIG. 4, the TDD B38*/41* band can have an Rx passband of 2496 MHz-2640 MHz.

Figure 11A:
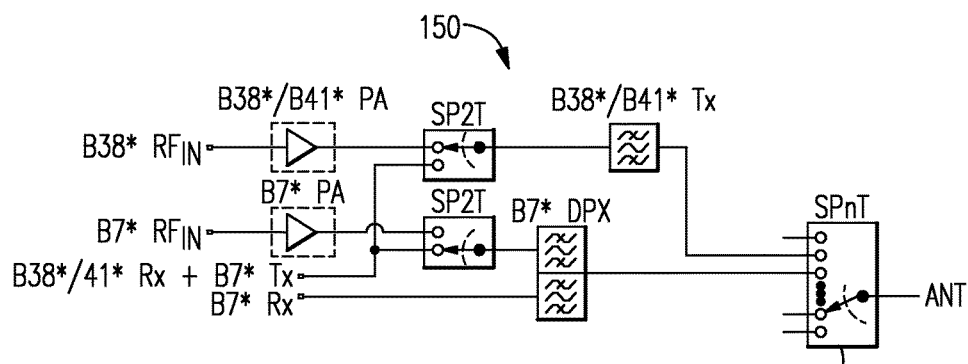
FIGS. 11A and 11B show example configurations that can be implemented to facilitate operation of wireless devices utilizing the example band structure of FIG. 10.
Figure 11B:
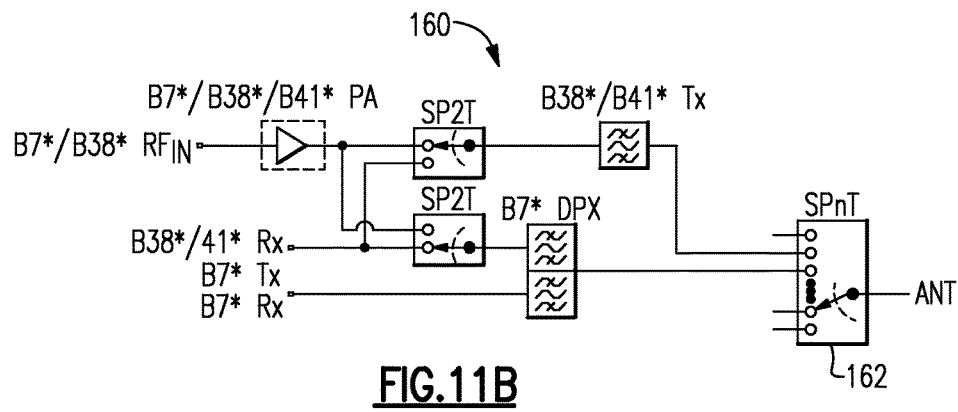

FIGS. 11A and 11B show example configurations 150, 160 that can be implemented to facilitate operation of wireless devices utilizing the example band structure of FIG. 10. In both examples, a TDD Rx filter (e.g., "B38*/B41* Rx" filter in FIGS. 5A and 5B) can be eliminated, and functionality associated with such an Rx filter can be consolidated with the Tx side of a "B7* DPX" duplexer.

Accordingly, in the example configuration 150 of FIG. 11A, transmission of an amplified B38* RFIN signal (amplified by B38*/B41* PA) can be achieved by routing the amplified signal to the antenna pole of an antenna switch 152 through an upper SP2T switch (as shown in FIG. 11A) and a B38*/B41* Tx filter. A signal received through the antenna pole of the antenna switch 152 can be routed to a B38*/B41* Rx node through the Tx portion of the B7* DPX duplexer and a lower SP2T switch. Such a signal received through the antenna pole of the antenna switch 152 can also be routed to the B38*/B41* Rx node through the B38*/B41* Tx filter and the upper SP2T switch.

TDD operations associated with B38*/B41* Tx and B38*/B41* Rx can be achieved by switching operations of the upper and lower SP2T switches and the antenna switch 152, if the Tx side of the B7* DPX duplexer is utilized for the foregoing Rx routing. If the B38*/B41* Tx filter is utilized for the foregoing Rx routing, TDD operations associated with B38*/B41* Tx and B38*/B41* Rx can be achieved by keeping the antenna pole (of the antenna switch 152) connected with the throw associated with the B38*/B41* Tx filter, and performing switching operations of the upper SP2T switch.

In the example of FIG. 11A, FDD operation of B7* can be achieved through the B7* DPX duplexer. The Tx side of the duplexer is shown to receive an amplified B7* RFIN signal (amplified by B7* PA) through the lower SP2T switch and output the filtered signal to the antenna pole of the antenna switch 152. The Rx side of the duplexer is shown to receive a signal from the antenna pole of the antenna switch 152, the filtered signal is shown to be routed to a B7* Rx node.

The example configuration 160 of FIG. 11B can be similar to the example of FIG. 11A, except that in FIG. 11B, signals to be transmitted for B7* and B38*/B41* can be amplified by a common PA (B7*/B38*/B41* PA) (instead of two separate PAs in FIG. 11A). Accordingly, TDD operation of Tx portion of B38*/B41* can be achieved through the B38*/B41* Tx filter as in FIG. 11A. FDD operation of Tx portion of B7* can be achieved through the lower SP2T switch and the Tx side of the B7* DPX duplexer. Rx TDD operation of B38*/B41*, as well as Rx FDD operation of B7*, can be achieved as in the example of FIG. 11A.

Features associated with the filter performance in regions of overlap, as described herein, can benefit the TDD mode, but the FDD mode can still be limited by the fundamental duplexer performance (e.g., unchanged from the standard band dedicated performance of Band 7). In the TDD mode, filter performance can be improved due to, for example, reduction in relative percentage bandwidth of 5.3% (140 MHz/(2550 MHz+70 MHz) for the B38*/B41* band), and the duplexer insertion loss (while generally higher due to out-of-band attenuation and isolation requirements) can be mitigated by a smaller relative percentage bandwidth of 2.6% (70 MHz/(2620 MHz+35 MHz) for the B7* Rx band) and the benefit of the overlap region to reduce the attenuation on the side of the filter nearest the guard band and duplex gap, where typical duplexer insertion losses are typically the worst.

Another benefit that can be obtained by the foregoing example is that a WiFi band and requirements for coexistence can be provided by the duplexer itself at this smaller relative percentage passband bandwidth. Such an advantage can allow a design to satisfy, for example, requirements for a full Band 41 bandwidth which otherwise can incur significant penalty.

Figure 12:
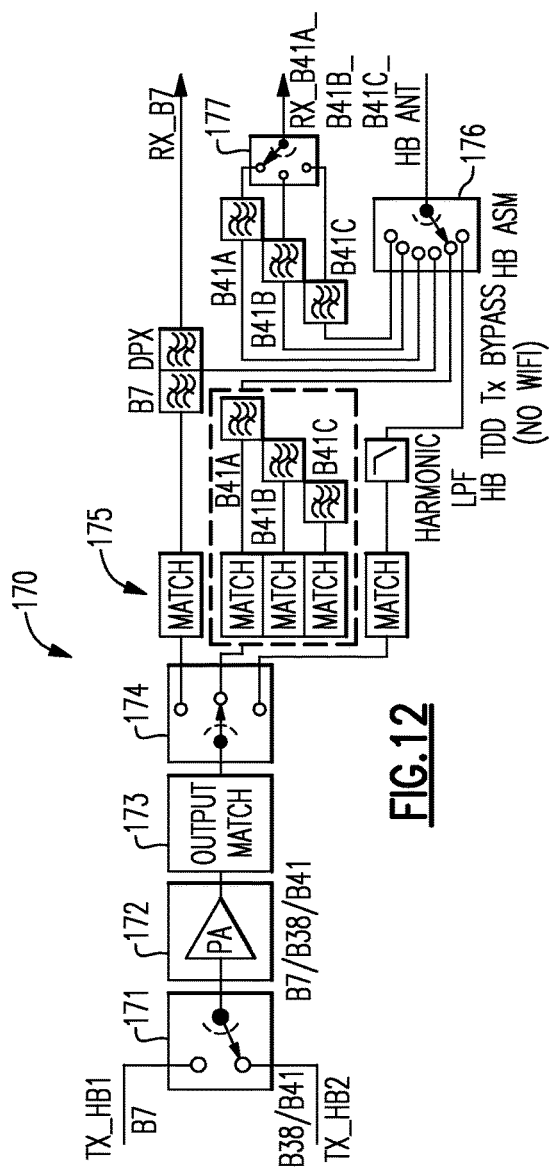
FIGS. 12 and 13 show examples related to how one or more features as described herein can be implemented to provide improvements in coexistence of a WiFi band and nearby frequency bands such as B7 Tx band and B41 band.
Figure 13:
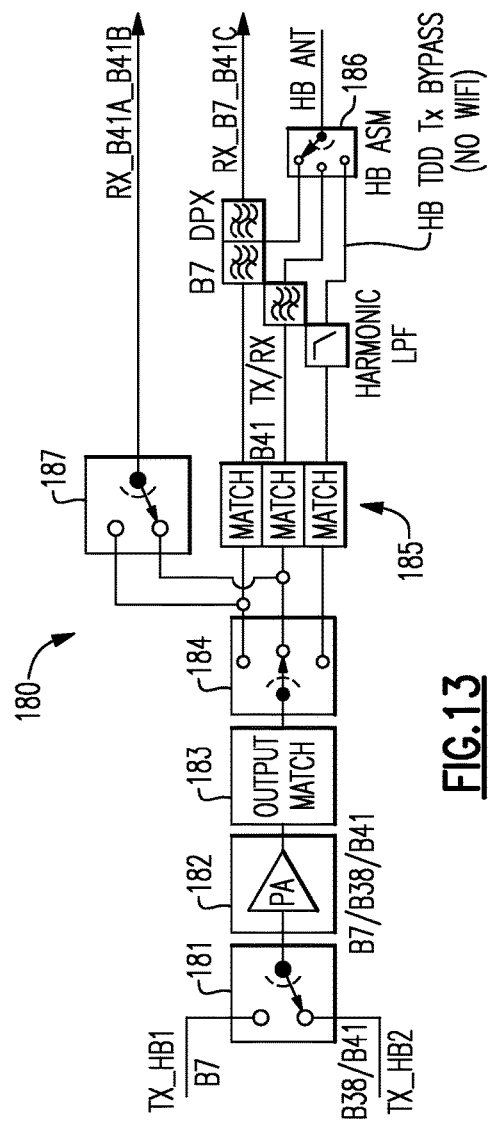

FIGS. 12 and 13 show examples related to how one or more features as described herein (e.g., consolidation of paths and/or re-use of filter(s)) can be implemented to provide improvements in coexistence of a WiFi band (e.g., 2.4 GHz WiFi band) and nearby frequency bands such as B7 Tx band and B41 band. It is noted that B7 (FDD, 2500 MHz-2570 MHz for Tx, and 2620 MHz-2690 MHz for Rx) and B41 (TDD, 2496 MHz-2690 MHz) bands in LTE front-end architectures in handsets are faced with challenges for coexistence with 2.4 GHz WiFi band (2400 MHz-2500 MHz). For example, relatively large bandwidths are involved in such LTE architectures, and tight out-of-band attenuation for coexistence with the nearby 2.4 GHz WiFi is typically required or desired. In another example, relatively high losses can occur at a relatively high frequencies around 2.5 GHz due to switch throw count and other architecture design issues.

FIG. 12 shows an example of a front-end architecture 170 that can address the foregoing challenges associated with the 2.4 GHz WiFi band and one or more nearby LTE bands. Such a front-end architecture is shown to include segmenting of the TDD B41 band into multiple frequency ranges (e.g., B41A, B41B, B41C) so as to reduce the bandwidth of each filter (configured for B41A, B41B or B41C), and to improve in-band insertion loss/out-of-band attenuation performance.

Referring to FIG. 12, a first input RF signal (B7) and a second input RF signal (B38/B41) are shown to be provided to a PA 172 configured to provide power amplification for a frequency range that covers B7, B38 and B41. Selection of such two inputs can be achieved by a switch 171 (e.g., an SP2T switch). An output matching circuit 173 can be provided at the output of the PA 172, and such a matching circuit can be configured to provide impedance matching functionality for the frequency range associated with the PA 172.

The amplified B7 signal is shown to be routed to a B7 duplexer ("B7 DPX") through a band selection switch 174 and a corresponding matching circuit (e.g., one of a group collectively indicated as 175). The amplified and filtered B7 signal is shown to be routed from the B7 duplexer ("B7 DPX") to an antenna ("HB ANT") through an antenna switch 176 (e.g., an antenna switch module ("HB ASM")).

In the example of FIG. 12, a B38 signal (having a band that is a sub-set of the B41 band) can be processed as described herein. For the sake of clarity in the context of processing the segmented portions of the large-bandwidth B41 band, FIG. 12 shows that an amplified B41 signal can be routed (through the band selection switch 174) to an assembly of segmented matching circuits and filters corresponding to B41A, B41B and B41C. Such segment-filtered signals are shown to be routed to the antenna (HB ANT) through the antenna switch 176.

Referring to FIG. 12, when WiFi operation is turned OFF, the foregoing segmented filtering may not be needed. In such a situation, an amplified B41 signal can be routed so as to bypass the foregoing segmented filters. For example, the amplified B41 signal can be provided to a low-pass filter (LPF) (e.g., to filter out one or more harmonics) through the band selection switch 174 and a corresponding matching circuit. The filtered B41 signal can then be routed to the antenna (HB ANT) through the antenna switch 176.

In the example of FIG. 12, separate Rx filters are shown to be implemented for the segmented bands B41A, B41B and B41C. Such filters are shown to receive their respective signals through the antenna switch 176. The corresponding filtered Rx signals are shown to be routed for further processing (e.g., to one or more LNAs (not shown)) through a band-selection switch 177.

In the example of FIG. 12, there are six TDD band-pass filters (B41A, B41B, B41C for Tx, and B41A, B41B, B41C for Rx) aside from the bypass LPF and the B7 duplexer (B7 DPX). Such band-pass filters can include relatively costly technologies, but are often utilized to meet performance requirements associated with the foregoing WiFi coexistence.

As described in reference to FIG. 2, standard 3GPP band frequency definitions are as follows in Table 1.

TABLE 1

| 3 GPP band | Tx Frequency | Rx Frequency |
| --- | --- | --- |
| B7 | 2500 MHz-2570 MHz | 2620 MHz-2690 MHz |
| B41 | 2496 MHz-2690 MHz | 2496 MHz-2690 MHz |
| B38 | 2570 MHz-2620 MHz | 2570 MHz-2620 MHz |

In the example of FIG. 12, the segmentation of B41 into B41A, B41B and B41C can result in band frequency definitions being as listed in Table 2.

TABLE 2

| Band | Tx Frequency | Rx Frequency |
| --- | --- | --- |
| B7 | 2500 MHz-2570 MHz | 2620 MHz-2690 MHz |
| B41A ≈ B7Tx | 2496 MHz-2570 MHz | 2496 MHz-2570 MHz |
| B41C = B7Rx | 2620 MHz-2690 MHz | 2620 MHz-2690 MHz |
| B38/B41B | 2550 MHz-2640 MHz | 2550 MHz-2640 MHz |

Referring to Table 2 and FIG. 12, one can see that the front-architecture 170 does not utilize filters in an efficient manner. For example, there are six filters (three for Tx and three for Rx) for processing of the Tx and Rx bands for 41A, 41B and 41C, even though the frequency ranges are identical between the Tx and Rx bands. Further, one can see that the B41A band has a frequency range that is approximately the same as the frequency range for B7Tx. Similarly, the B41C band has a frequency range that is the same as the frequency range for B7Rx.

FIG. 13 shows that in some embodiments, a front-end architecture 180 can be configured to provide similar functionality as the example of FIG. 12, but with a significantly reduced number of components such as filters. In the architecture 180 of FIG. 13, a first input RF signal (B7) and a second input RF signal (B38/B41) are shown to be provided to a PA 182 configured to provide power amplification for a frequency range that covers B7, B38 and B41, similar to the example of FIG. 12. Selection of such two inputs can be achieved by a switch 181 (e.g., an SP2T switch). An output matching circuit 183 can be provided at the output of the PA 182, and such a matching circuit can be configured to provide impedance matching functionality for the frequency range associated with the PA 182.

For a Tx operation, the amplified B7 signal is shown to be routed to a B7 duplexer ("B7 DPX") through a band selection switch 184 and a corresponding matching circuit (e.g., one of a group collectively indicated as 185). The amplified and filtered B7 signal is shown to be routed from the B7 duplexer ("B7 DPX") to an antenna ("HB ANT") through an antenna switch 186 (e.g., an antenna switch module ("HB ASM")).

For an Rx operation, a signal received through the antenna is shown to be routed to the B7 duplexer ("B7 DPX") by the antenna switch 186. The filtered B7 signal is shown to be routed to an Rx path Rx_B7_B41C.

In the architecture 180 of FIG. 13, band frequency definitions as listed in Table 3 can be implemented.

TABLE 3

| Band | Tx Frequency | Rx Frequency |
|---|---|---|
| B7 | 2496 MHz-2570 MHz | 2620 MHz-2690 MHz |
| B41A = B7Tx (Re-used) | 2496 MHz-2570 MHz | 2496 MHz-2570 MHz |
| B41C = B7Rx (Re-used) | 2620 MHz-2690 MHz | 2620 MHz-2690 MHz |
| B38/B41B | 2530 MHz-2660 MHz | 2530 MHz-2660 MHz |

Accordingly, each of B41 (including B41A, B41B, B41C) and B38 band signals for transmission (Tx) can be routed to the PA 182 by the switch 181, and the amplified signal can be routed to the antenna (HB_ANT in FIG. 13) through the output match circuit 183, the band selection switch 184, a corresponding matching circuit among the group 185, a common B41 Tx/Tx filter, and the antenna switch 186.

For Rx operations, a B41A band signal can be routed through the Tx side of the B7 DPX duplexer. Thus, in this example, a Tx side of an FDD duplexer is being re-used for an Rx TDD operation. The filtered B41A band signal can then be routed to an Rx path (Rx_B41A_B41B) through the B7 matching circuit (among the group 185) and a band selection switch 187 (e.g., SP2T). Accordingly, TDD operations involving B41A band signals can be achieved by the switch 181 being in a lower-throw state (as shown in FIG. 13), the switch 184 being in a middle-throw state, the switch 187 being in an upper-throw state, and the antenna switch 186 performing TDD switching between the middle and upper throws.

In the example of FIG. 13, a B41B Rx signal (or a B38 Rx signal) can be routed through the B41 Tx/Rx filter. Thus, in this example, a filter is being used for both Tx and Rx operations. The filtered B41B band signal can then be routed to the Rx path (Rx_B41A_B41B) described above for B41A Rx operation, through the B41 Tx/Rx matching circuit (among the group 185) and the band selection switch 187. Accordingly, TDD operations involving B41B band signals can be achieved by the switch 181 being in a lower-throw state (as shown in FIG. 13), the antenna switch 186 being in a middle-throw state, and TDD switching operations being performed by, for example, the switches 184 and 187. For example, the switch 184 can be in a middle-throw state, and the switch 187 can be in a state other than a lower-throw state, during a Tx phase. Similarly, the switch 184 can be in a state other than a middle-throw state, and the switch 187 can be in a lower-throw state, during an Rx phase.

In the example of FIG. 13, the B41B Rx signal can also be routed through the Tx side of the B7 DPX duplexer, similar to the B41A Rx signal. In such a configuration, the B41B band signal can be routed from the Tx side of the B7 DPX duplexer to the Rx path (Rx_B41A_B41B) through the band selection switch 187.

In the example of FIG. 13, a B41C band signal can be routed through the Rx side of the B7 DPX duplexer. Thus, in this example, an Rx side of an FDD duplexer is being re-used for an Rx TDD operation. The filtered B41C band signal can then be routed to the Rx path (Rx_B7_B41C) which is also utilized for the above-described B7 Rx signal. Accordingly, TDD operations involving B41C band signals can be achieved by the switch 181 being in a lower-throw state (as shown in FIG. 13), the switch 184 being in a middle-throw state, the switch 187 being in an upper-throw state, and the antenna switch 186 performing TDD switching between the middle and upper throws.

Referring to FIG. 13, when WiFi operation is turned OFF, an amplified B41 (or B38) signal can be routed so as to bypass the foregoing TDD Tx routing. For example, the amplified B41 signal can be provided to a low-pass filter (LPF) (e.g., to filter out one or more harmonics) through the band selection switch 184 and a corresponding matching circuit. The filtered B41 signal can then be routed to the antenna (HB ANT) through the antenna switch 186.

As described above in reference to FIG. 13, an FDD B7 path can be operated with Tx/Rx switching functionality to re-use FDD filters for TDD operations. If such FDD filters are configured appropriately, a single TDD can facilitate various TDD operations associated with B38 and B41 bands, instead of six filters in the example of FIG. 12. Further, with the segmentation of B41 into B41A, B41B and B41C, out-of-band attenuation performance can be improved while saving cost and footprint area due to the significantly lowered filter count.

As described herein, various features associated with utilizing TDD overlap bands to consolidate paths, consolidating the overlap areas with desired reduction in passband bandwidth in TDD implementations, re-use of Tx/Rx filter(s) and associated circuits, and/or some combination thereof can be implemented in wireless devices having TDD and/or merged TDD+FDD front-end architectures.

Various examples of architectures having one or more features described herein can be implemented in a number of different ways and at different product levels. Some of such product implementations are described by way of examples.

Figure 14A:
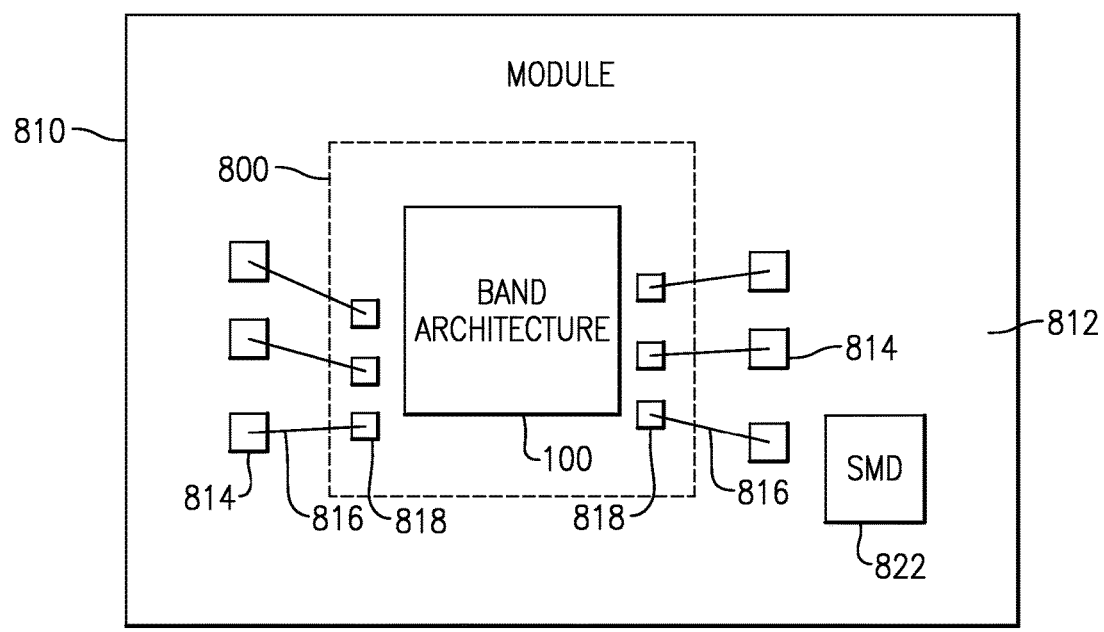
FIGS. 14A and 14B show different views of an example RF module having one or more features as described herein.
Figure 14B:
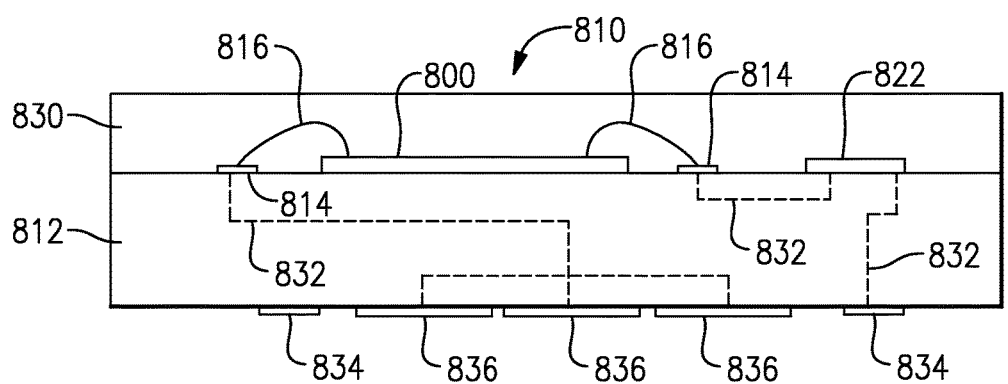

In some embodiments, one or more die having one or more features described herein can be implemented in a packaged module. An example of such a module is shown in FIGS. 14A (plan view) and 14B (side view). A module 810 is shown to include a packaging substrate 812. Such a packaging substrate can be configured to receive a plurality of components, and can include, for example, a laminate substrate or a ceramic substrate. The components mounted on the packaging substrate 812 can include one or more die. In the example shown, a die 800 having at least some of a band architecture 100 as described herein is shown to be mounted on the packaging substrate 812. The die 800 can be electrically connected to other parts of the module (and with each other where more than one die is utilized) through connections such as connection-wirebonds 816. Such connection-wirebonds can be formed between contact pads 818 formed on the die 800 and contact pads 814 formed on the packaging substrate 812. In some embodiments, one or more surface mounted devices (SMDs) 822 can be mounted on the packaging substrate 812 to facilitate various functionalities of the module 810.

In some embodiments, the packaging substrate 812 can include electrical connection paths for interconnecting the various components with each other and/or with contact pads for external connections. For example, a connection path 832 is depicted as interconnecting the example SMD 822 and the die 800. In another example, a connection path 832 is depicted as interconnecting the SMD 822 with an external-connection contact pad 834. In yet another example a connection path 832 is depicted as interconnecting the die 800 with ground-connection contact pads 836.

In some embodiments, a space above the packaging substrate 812 and the various components mounted thereon can be filled with an overmold structure 830. Such an overmold structure can provide a number of desirable functionalities, including protection for the components and wirebonds from external elements, and easier handling of the packaged module 810.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 15:
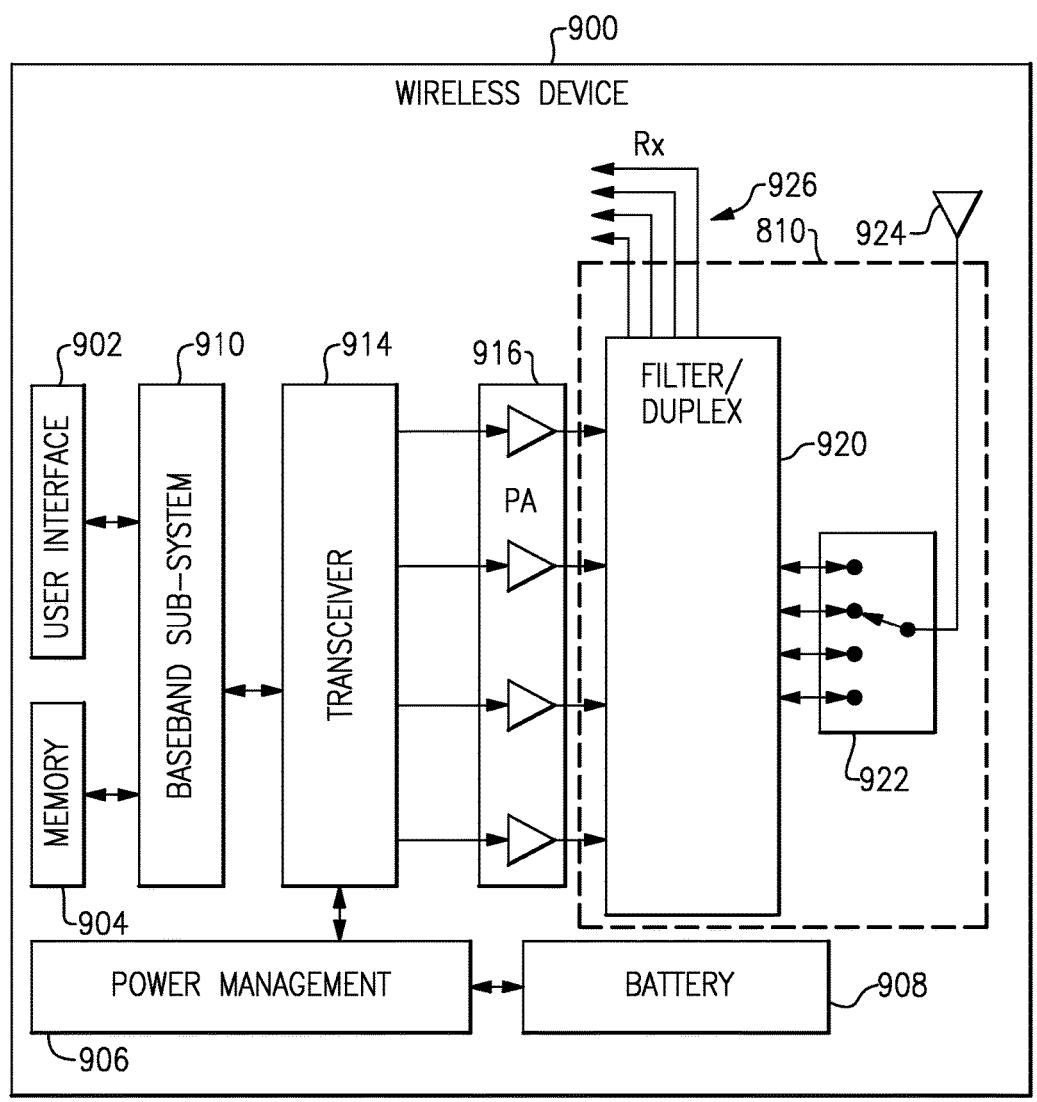
FIG. 15 shows an example wireless device having one or more advantageous features as described herein.

FIG. 15 depicts an example wireless device 900 having one or more advantageous features described herein. In the context of various band architectures as described herein, some or all of a band architecture can be part of a module 810. In some embodiments, such a module can be a front-end module configured to facilitate, for example, multi-band multi-mode operation of the wireless device 900. The module 810 can include an assembly of one or more filters and/or one or more duplex circuits (920) configured to provide one or more features described herein. The module 810 can include a switch 922 for routing various band paths to and from an antenna 924.

In the example wireless device 900, a power amplifier (PA) module 916 having a plurality of PAs can provide an amplified RF signal to the switch 922 (via the filter/duplexer 920), and the switch 922 can route the amplified RF signal to an antenna. The PA module 916 can receive an unamplified RF signal from a transceiver 914 that can be configured and operated in known manners. The transceiver can also be configured to process received signals.

The transceiver 914 is shown to interact with a baseband sub-system 910 that is configured to provide conversion between data and/or voice signals suitable for a user and RF signals suitable for the transceiver 914. The transceiver 914 is also shown to be connected to a power management component 906 that is configured to manage power for the operation of the wireless device 900. Such a power management component can also control operations of the baseband sub-system 910 and the module 810.

The baseband sub-system 910 is shown to be connected to a user interface 902 to facilitate various input and output of voice and/or data provided to and received from the user. The baseband sub-system 910 can also be connected to a memory 904 that is configured to store data and/or instructions to facilitate the operation of the wireless device, and/or to provide storage of information for the user.

In some embodiments, the filter/duplexer 920 can allow transmit and receive operations to be performed in a TDD, an FDD mode, or some combination thereof, using a common antenna (e.g., 924). In FIG. 15, received signals are shown to be routed to "Rx" paths 926 that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands can include some or all of bands defined by "E-UTRA Operating Bands," and examples of such defined bands are listed in Table 4. It will be understood that at least some of the bands can be divided into sub-bands. It will also be understood that one or more features of the present disclosure can be implemented with frequency ranges that do not have designations such as the examples of Table 4.

For the purpose of description herein, it will be understood that a modified band can be a TDD band or an FDD band. Further, a modified band can be a Tx band or an Rx band. In some embodiments, a modified band having one or more of the foregoing properties can be based on a band defined by "E-UTRA Operating Bands."

For example, B38* modified bands can be based on B38 (2570 MHz-2620 MHz) listed in Table 4. A B38* Tx band can have a frequency range of 2550 MHz-2690 MHz, and a B38* Rx band can have a frequency range of 2496 MHz-2640 MHz. In such a configuration, the B38* Tx and B38* Rx bands overlap in a frequency range of 2550 MHz-2640 MHz.

In another example, B41* modified bands can be based on B41 (2496 MHz-2690 MHz) listed in Table 4. A B41* Tx band can have a frequency range of 2550 MHz-2690 MHz, and a B41* Rx band can have a frequency range of 2496 MHz-2640 MHz. In such a configuration, the B41* Tx and B41* Rx bands overlap in a frequency range of 2550 MHz-2640 MHz.

In another example, some or all of B7* modified bands can be based on B7 bands (2500 MHz-2570 MHz for Tx, 2620 MHz-2690 MHz for Rx) listed in Table 4. A B7* Tx band can have a frequency range of 2496 MHz-2690 MHz, and a B41* Rx band can have the same frequency range as B7 Rx. It will be understood that either or both of B7* Tx and B7* Rx can be different from their respective unmodified bands B7 Tx and B7 Rx.

In another example, B41* modified bands can be based on B41 (2496 MHz-2690 MHz) listed in Table 4. A B41* TDD-A band can have a frequency range of 2496 MHz-2605 MHz, and a B41* TDD-B band can have a frequency range of 2585 MHz-2690 MHz. In such a configuration, the B41* TDD-A and B41* TDD-B bands overlap in a frequency range of 2585 MHz-2605 MHz.

It will be understood that other modified band structures can be implemented to facilitate one or more features as described herein.

TABLE 4

| Band | Mode | Tx Frequency Range (MHz) | Rx Frequency Range (MHz) |
| --- | --- | --- | --- |
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |

TABLE 4-continued

| Band | Mode | Tx Frequency Range (MHz) | Rx Frequency Range (MHz) |
|---|---|---|---|
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless architecture comprising a circuit configured to support a first modified time-division duplex (TDD) transmit band and a modified TDD receive band corresponding to the TDD transmit band, the modified TDD transmit and receive bands including an overlapping frequency range, at least one of the modified TDD transmit and receive bands including a non-overlapping frequency range that does not overlap with the other modified TDD band, the circuit including a transmit filter configured to support a transmit operation with at least the modified TDD transmit band, and a receive filter configured to support a receive operation with at least the modified TDD receive band.

2. The wireless architecture of claim 1 wherein the overlapping frequency range has a bandwidth that is less than or equal to a lesser of bandwidths of the modified TDD transmit and receive bands.

3. The wireless architecture of claim 1 wherein the modified TDD transmit band includes a frequency range of 2550 MHz-2690 MHz based on E-UTRA bands B38 and B41, and the modified TDD receive band includes a frequency range of 2496 MHz-2640 MHz based on the E-UTRA bands B38 and B41.

4. The wireless architecture of claim 1 wherein at least one of the modified TDD transmit and receive bands includes a frequency range associated with a frequency-division duplex (FDD) band.

5. The wireless architecture of claim 4 wherein the modified TDD transmit band is based on an E-UTRA TDD band, and the modified TDD receive band is based on an E-UTRA FDD band.

6. The wireless architecture of claim 5 wherein the circuit further includes a portion of a duplexer configured to support the modified TDD receive band.

7. The wireless architecture of claim 6 wherein the portion of the duplexer includes a transmit portion of the duplexer.

8. The wireless architecture of claim 7 wherein the modified TDD transmit band includes a frequency range of 2496 MHz-2640 MHz based on E-UTRA bands B38 and B41, and the modified TDD receive band includes a frequency range of 2496 MHz-2570 MHz based on an E-UTRA band B7 Tx.

9. The wireless architecture of claim 6 wherein the portion of the duplexer includes a receive portion of the duplexer.

10. The wireless architecture of claim 9 wherein the modified TDD transmit band includes a frequency range of 2550 MHz-2690 MHz based on E-UTRA bands B38 and B41, and the modified TDD receive band includes a frequency range of 2620 MHz-2690 MHz based on an E-UTRA band B7 Rx.

11. The wireless architecture of claim 10 wherein the modified TDD transmit band includes one or more of a plurality of band segments in the frequency range of 2550 MHz-2690 MHz.

12. The wireless architecture of claim 11 wherein the modified TDD transmit band includes a band segment having a frequency range of 2620 MHz-2690 MHz based on an E-UTRA band B41.

13. A front-end module comprising:
a packaging substrate configured to receive a plurality of components; and
a radio-frequency circuit implemented on the packaging substrate, and configured to support a modified time-division duplex (TDD) transmit band and a modified TDD receive band corresponding to the TDD transmit band, the modified TDD transmit and receive bands including an overlapping frequency range, at least one of the modified TDD transmit and receive bands including a non-overlapping frequency range that does not overlap with the other modified TDD band, the radio-frequency circuit including a transmit filter configured to support a transmit operation with at least the modified TDD transmit band, and a receive filter configured to support a receive operation with at least the modified TDD receive band.

14. A wireless device comprising:
a transceiver configured to process signals;
an antenna in communication with the transceiver and configured to facilitate transmission of an amplified signal; and
a front-end module in communication with the transceiver and the antenna, the front-end module configured to support a modified time-division duplex (TDD) transmit band and a modified TDD receive band corresponding to the TDD transmit band, the modified TDD transmit and receive bands including an overlapping frequency range, at least one of the modified TDD transmit and receive bands including a non-overlapping frequency range that does not overlap with the other modified TDD band, the front-end module including a transmit filter configured to support a transmit operation with at least the modified TDD transmit band, and a receive filter configured to support a receive operation with at least the modified TDD receive band.

\* \* \* \* \*